United States Patent
Spiegel et al.

(10) Patent No.: US 12,246,821 B2
(45) Date of Patent: Mar. 11, 2025

(54) HOVER AND THRUST CONTROL ASSEMBLY FOR DUAL-MODE AIRCRAFT

(71) Applicant: BETA AIR, LLC, South Burlington, VT (US)

(72) Inventors: Cody Spiegel, Charlotte, VT (US); Dale Williams, Winooski, VT (US)

(73) Assignee: BETA AIR LLC, South Burlington, VT (US)

( * ) Notice: Subject to any disclaimer, the term of this patent is extended or adjusted under 35 U.S.C. 154(b) by 0 days.

(21) Appl. No.: 17/972,830

(22) Filed: Oct. 25, 2022

(65) Prior Publication Data

US 2023/0056695 A1    Feb. 23, 2023

Related U.S. Application Data

(63) Continuation of application No. 17/001,845, filed on Aug. 25, 2020, now Pat. No. 11,518,497, which is a continuation-in-part of application No. 16/929,206, filed on Jul. 15, 2020, now Pat. No. 11,560,225.

(51) Int. Cl.
| | | |
|---|---|---|
| *B64C 13/04* | (2006.01) | |
| *B64C 13/50* | (2006.01) | |
| *B64C 29/00* | (2006.01) | |
| *B33Y 80/00* | (2015.01) | |

(52) U.S. Cl.
CPC ........ *B64C 13/0421* (2018.01); *B64C 13/503* (2013.01); *B64C 13/505* (2018.01); *B33Y 80/00* (2014.12); *B64C 29/0033* (2013.01)

(58) Field of Classification Search
CPC . B64C 13/0421; B64C 13/505; B64C 13/503; B64C 29/0033; B64C 29/0025; B33Y 80/00
See application file for complete search history.

(56) References Cited

U.S. PATENT DOCUMENTS

| | | |
|---|---|---|
| 3,604,664 A | 9/1971 | Mahoney |
| 3,700,995 A | 10/1972 | Parkinson et al. |
| 3,719,336 A | 3/1973 | Fowler et al. |
| 3,754,440 A | 8/1973 | Edgerton et al. |

(Continued)

FOREIGN PATENT DOCUMENTS

| | | |
|---|---|---|
| EP | 3382668 A1 | 1/2020 |
| WO | WO2011002517 A2 | 1/2011 |

*Primary Examiner* — Rodney A Bonnette
(74) *Attorney, Agent, or Firm* — Lee & Hayes, P.C.

(57) ABSTRACT

A hover and thrust control assembly for dual-mode aircraft including a plurality of flight components mechanically coupled to an aircraft includes a support structure attached to an aircraft frame of an aircraft having a control stick coupled to the support structure. The control stick may include a length and radius and configured to be manipulated along a plurality of axes, wherein the manipulation of the control stick produces an electronic signal, wherein the control stick is further configured to be manipulated rotationally about the length of the control stick. A first interface device disposed on the control stick may be configured to receive an interaction and adjust a lift of the dual-mode aircraft as a function of the interaction. A second interface device may be configured to receive an interaction and adjust the lift of the dual-mode aircraft as a function of the interaction.

20 Claims, 11 Drawing Sheets

(56) References Cited

U.S. PATENT DOCUMENTS

| | | |
|---|---|---|
| 4,330,827 A | 5/1982 | Kettler |
| 5,330,131 A | 7/1994 | Burcham et al. |
| 5,945,646 A | 8/1999 | Miller et al. |
| 6,041,273 A | 3/2000 | Burken et al. |
| 6,102,330 A | 8/2000 | Burken et al. |
| 6,644,588 B2 | 11/2003 | King et al. |
| 8,235,330 B2 | 8/2012 | Rozovski |
| 9,377,784 B2 | 6/2016 | Kowalski et al. |
| 9,791,886 B2 | 10/2017 | Ouellette |
| 9,815,566 B1 | 11/2017 | Innis et al. |
| 9,898,033 B1* | 2/2018 | Long ................... G05G 9/04792 |
| 9,908,614 B2 | 3/2018 | Cherepinsky et al. |
| 10,144,504 B1* | 12/2018 | Selwa .................... G05D 1/652 |
| 2014/0027565 A1* | 1/2014 | Marvin ................ G05D 1/0858 |
| | | 244/17.13 |
| 2014/0353433 A1* | 12/2014 | Gemmati ............ B64C 13/0427 |
| | | 244/234 |
| 2017/0308113 A1* | 10/2017 | Izzo ........................ B64C 13/12 |
| 2018/0099738 A1 | 4/2018 | Achttien et al. |
| 2019/0165408 A1* | 5/2019 | Andryukov ....... H01M 10/0481 |
| 2019/0329879 A1 | 10/2019 | Irwin, III et al. |
| 2021/0031442 A1* | 2/2021 | Sinha ................... B29C 64/147 |

* cited by examiner

HOVER AND THRUST CONTROL ASSEMBLY FOR DUAL-MODE AIRCRAFT

CROSS-REFERENCE TO RELATED APPLICATIONS

This application is a continuation of U.S. Nonprovisional patent application Ser. No. 17/001,845, filed on Aug. 25, 2020, and entitled "A HOVER AND THRUST CONTROL ASSEMBLY FOR DUAL-MODE AIRCRAFT," which is a continuation in part of U.S. Nonprovisional application Ser. No. 16/929,206 filed on Jul. 15, 2020, and entitled "A HOVER AND THRUST CONTROL ASSEMBLY FOR DUAL-MODE AIRCRAFT." Each of U.S. patent application Ser. No. 17/001,845 and U.S. patent application Ser. No. 16/929,206 is incorporated by reference herein in its entirety.

FIELD OF THE INVENTION

The present invention generally relates to the field of aircraft and aircraft components. In particular, the present invention is directed to a hover and thrust control assembly for dual-mode aircraft.

BACKGROUND

The burgeoning of electric vertical take-off and landing (eVTOL) aircraft technologies promises an unprecedented forward leap in energy efficiency, cost savings, and the potential of future autonomous and unmanned aircraft. However, the technology of eVTOL aircraft is still lacking in crucial areas of energy efficiency and ease of control. The latter is particularly problematic as it compounds the already daunting challenges to pilots attempting to adjust to a rapidly evolving and increasingly unfamiliar form of aircraft.

SUMMARY OF THE DISCLOSURE

In an aspect, a hover and thrust control assembly for dual-mode aircraft including a plurality of flight components mechanically coupled to an aircraft includes a support structure attached to an aircraft frame of an aircraft having a control stick coupled to the support structure. The control stick may include a length and radius and configured to be manipulated along a plurality of axes, wherein the manipulation of the control stick produces an electronic signal, wherein the control stick is further configured to be manipulated rotationally about the length of the control stick. A first interface device disposed on the control stick may be configured to receive an interaction and adjust a lift of the dual-mode aircraft as a function of the interaction. A second interface device may be configured to receive an interaction and adjust the lift of the dual-mode aircraft as a function of the interaction.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Aspects of the present disclosure combine a hover and forward thrust control assembly for a dual-mode aircraft system. In an embodiment, an assembly may provide a user with the ability to control use of vertical propulsor and forward propulsor by use of a linear thrust control assembly that may be mounted to a throttle lever. In embodiments disclosed herein, mounted linear thrust control on a throttle lever may include haptic feedback. Some embodiments may aid a pilot in operating aircraft at efficient forward cruising speeds. Embodiments may further aid a pilot in operating controls in performing at an optimal rate. Further, embodiments disclosed herein may include battery shut-off switch, guard, and emergency failure indicators as part of the assembly, permitting rapid response to runaway thermal events in batteries.

Figure 1:
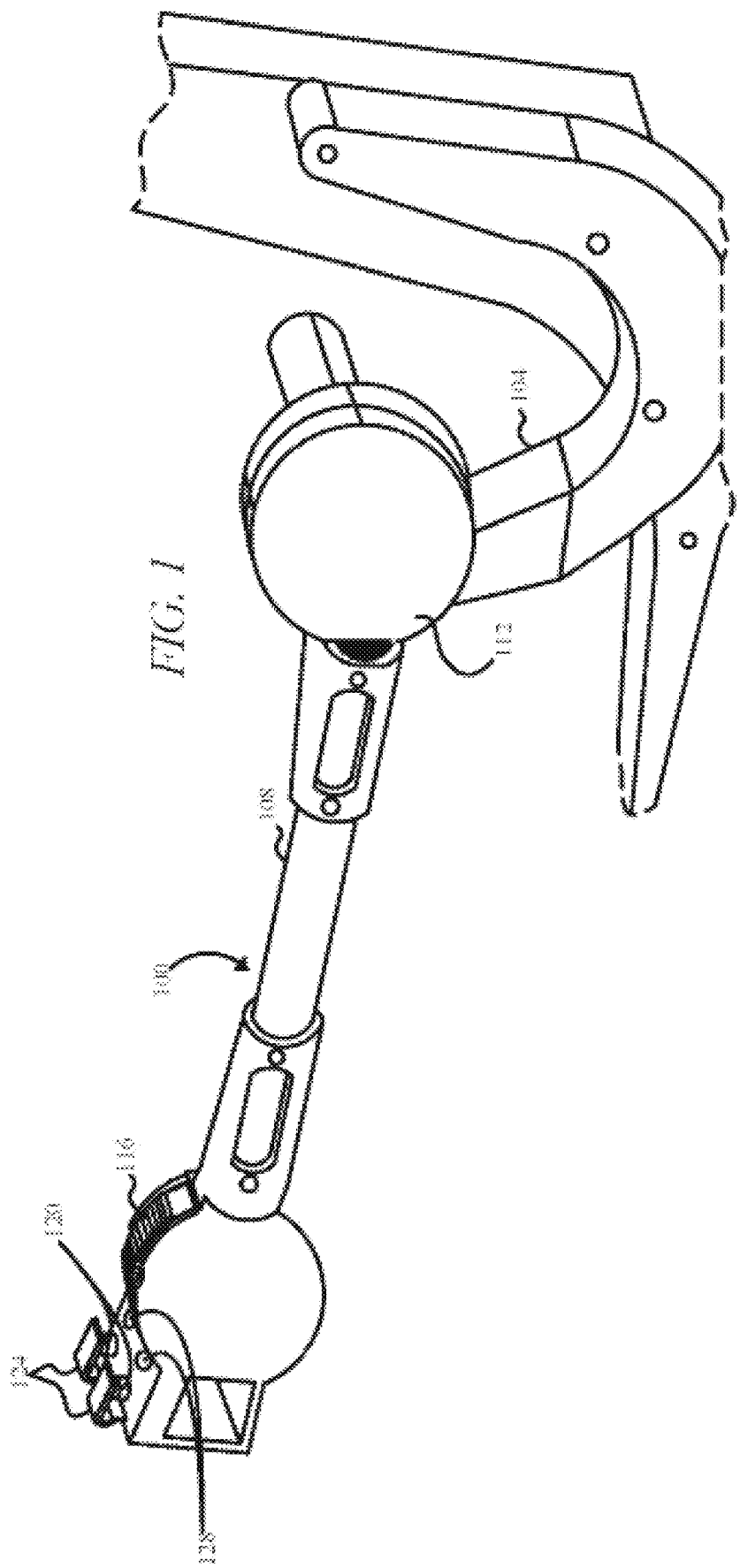
FIG. 1 illustrates an exemplary embodiment of a hover and thrust control assembly.

Referring now to FIG. 1, an exemplary combined hover and forward thrust control assembly 100 for a dual-mode aircraft system is illustrated. In an embodiment, a support structure 104 may attach the hover and forward thrust assembly 100 to an aircraft frame of an aircraft having at least a vertical propulsor and at least a forward propulsor. In an embodiment, hover and thrust control assembly 100 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling may include, as a non-limiting example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling can be used to connect the ends of adjacent parts and/or objects of an electric aircraft. Further, in an embodiment, mechanical coupling may be used to join two pieces of rotating electric aircraft components.

Figure 2:
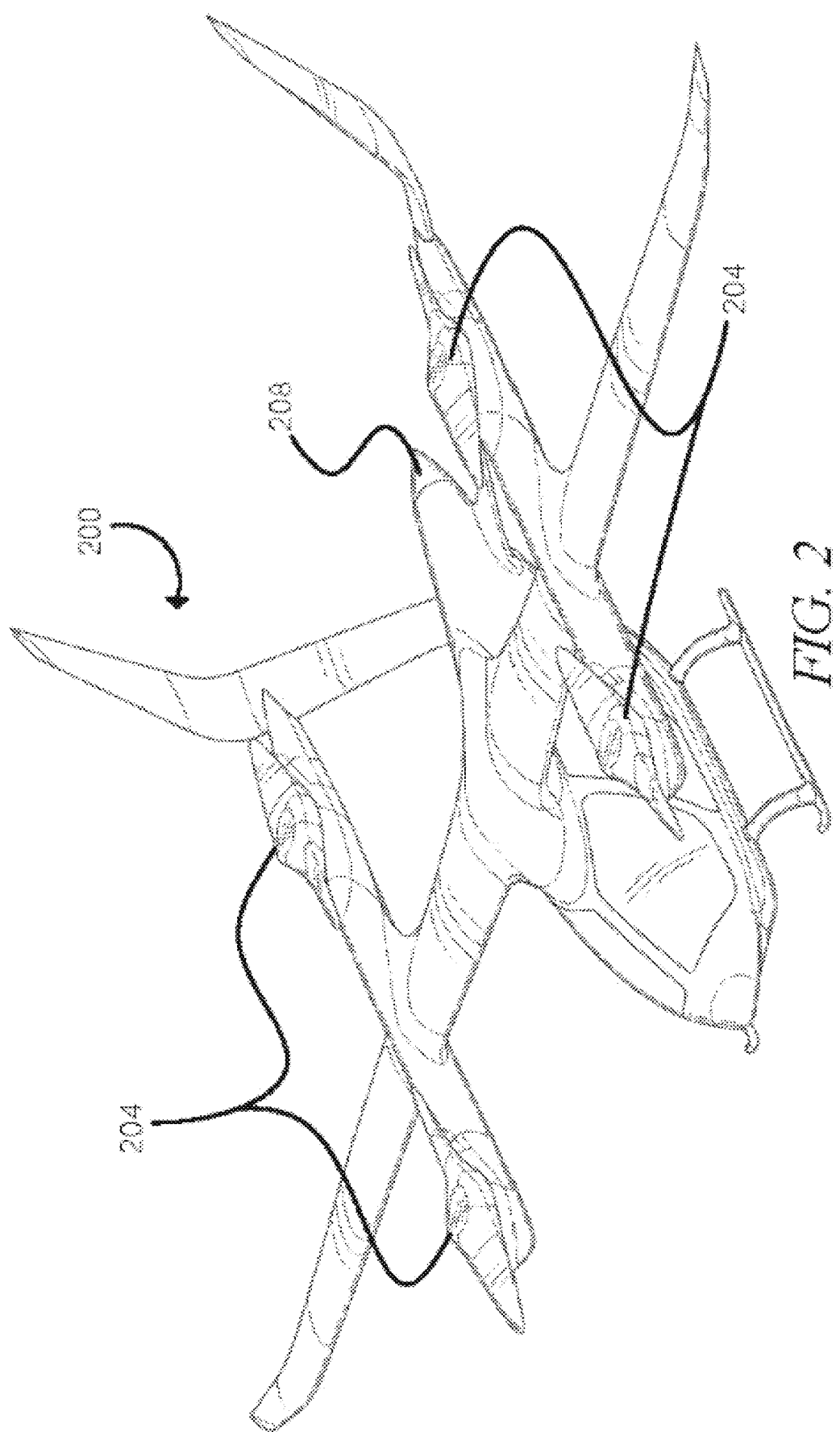
FIG. 2 illustrates an exemplary embodiment of an aircraft with vertical and forward propulsion.

Referring now to FIG. 2, an exemplary embodiment of a dual-mode aircraft 200 that may incorporate assembly as illustrated. Aircraft may include at least a vertical propulsor 204 and at least a forward propulsor 208. A forward propulsor is a propulsor that propels the aircraft in a forward direction. Forward in this context is not an indication of the propulsor position on the aircraft; one or more propulsors mounted on the front, on the wings, at the rear, etc. A vertical propulsor is a propulsor that propels the aircraft in a upward direction; one of more vertical propulsors may be mounted on the front, on the wings, at the rear, and/or any suitable location. A propulsor, as used herein, is a component or device used to propel a craft by exerting force on a fluid medium, which may include a gaseous medium such as air or a liquid medium such as water. At least a vertical propulsor 204 is a propulsor that generates a substantially downward thrust, tending to propel an aircraft in a vertical direction providing thrust for maneuvers such as without limitation, vertical take-off, vertical landing, hovering, and/or rotor-based flight such as "quadcopter" or similar styles of flight. At least a forward propulsor 208 as used in this disclosure is a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, takeoff, and/or landing, and/or may propel the aircraft forward or backward on the ground. At least a vertical propulsor 204 and at least a forward propulsor 208 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contra-rotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically coupled to the at least a first propulsor as a source of thrust. A motor may include without limitation, any electric motor, where an electric motor is a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varying or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

Referring again to FIG. 1, assembly 100 includes a throttle lever 108 rotatably mounted to the support structure 104. Persons skilled in the art, upon reviewing the entirety of this disclosure, will be aware of many possible features that may function as at least a support structure 104. At least a support structure 104 may be constructed of any suitable material or combination of materials, including without limitation metal such as aluminum, titanium, steel, or the like, polymer materials or composites, fiberglass, carbon fiber, wood, or any other suitable material. As a non-limiting example, support structure may be constructed from additively manufactured polymer material with a carbon fiber exterior; aluminum parts or other elements may be enclosed for structural strength, or for purposes of supporting, for instance, vibration, torque or shear stresses imposed by at least a propulsor. Rotating throttle lever 108 in a first direction increases power to vertical propulsor 204 and rotating the throttle lever in a second direction decrease power to the vertical propulsor 204. In illustrative embodiments, throttle lever 108 may rotate; for instance, and without limitation, throttle lever may rotate through a substantially vertical plane, such that rotation in a direction a pilot would understand as "up" corresponds to increased throttle to vertical propulsors, while a direction a pilot would understand as "down" corresponds to decreased throttle. The range of motion of a throttle lever may be adjustable, for instance and without limitation by around 6.0 inches range of motion at the throttle lever grip. Throttle lever 108 motion may be detected by at least an angular position sensor, a contactless sensor, a Hall effect sensor, or any combination thereof, for instance as described in further detail below. Throttle lever 108 sensor may include a plurality of independent sensors, wherein failure of a sensor does not affect the others. "Independent sensors," as used in this disclosure, are sensors that connect to a power source and/or logic circuit independently; in other words, the function of one does not depend on the function of another, so that failure of any sensor or sensors does not affect the function of any other sensor or sensors, enabling thrust lever to continue performing as designed. Rotation of throttle lever 108 may result in increase and/or decrease of throttle by increase or decrease of electrical energy and/or power to at least a vertical propulsor. Detection of throttle lever 108 rotation by sensors in the support structure 104 may result in a change in throttle to vertical thrusters, which may be signaled using any mechanical electrical signal, such as a voltage-controlled change in aircraft throttle. Persons skilled in the art, upon reviewing the entirety of this disclosure, will be aware of various ways to detect rotation of at least a propulsor that may be used or included in system 100 or an electric aircraft 200, as used and described herein.

Continuing to refer to FIG. 1, throttle lever 108 may include a resistance mechanism 112; the resistance mechanism 112 may generate a force resisting rotation of throttle lever 108. A resistance mechanism 112 may include, as a non-limiting example, a source of friction such as an electromagnetic clutch, magnetic particle clutch, pneumatic clutch, pneumatic brake, hydraulic brake, or a biasing means such as a spring-biased selection position, isometric construction, or any component designed to increase or decrease resistance based on an electrical signal from another component, or from a control circuit such as a logic circuit. Persons skilled in the art, upon reviewing the entirety of this disclosure, will be aware of various ways to apply friction to rotation of at least a lever that may be used or included in assembly 100 or a dual-mode aircraft 200, as used and described herein. In an embodiment, resistance mechanism 112 may resist rotation of throttle lever 108 under influence of gravity, for instance if released by a pilot; in other words, resistance mechanism 112 may generate a force that is greater than the force exerted on a throttle lever 108 by gravity. This may prevent throttle lever 108 from dropping if accidentally or otherwise released, so that thrust of vertical propulsor 204 is maintained at substantially a level attained prior to release of the thrust lever 108. In an embodiment, resistance mechanism 112 may increase resistance of rotation of the throttle lever 108 when a linear thrust control, as further described below, is moved in one or more directions. Resistance to throttle lever 108 may be mediated by a source of friction as described previously; control of resistance may informed by a plurality of sensors, as described in further detail below, tracking control of the throttle lever 108 and a linear thrust control. The detection of a linear thrust control may be detected by at least an angular position sensor as described above; a control circuit may determine direction of motion based on input from at least an angular position sensor and direct resistance mechanism to increase and/or decrease resistance accordingly. Control circuit may include an embedded or attached logic circuit, processor, microcontroller or the like; control circuit may include, be included in, and/or communicate with an aircraft controller. Aircraft controller may include and/or communicate with any computing device, including without limitation a microcontroller, microprocessor, digital signal processor (DSP) and/or system on a chip (SoC). Aircraft controller may be programmed to operate electronic aircraft to perform at least a flight maneuver; at least a flight maneuver may include takeoff, landing, stability control maneuvers, emergency response maneuvers, regulation of altitude, roll, pitch, yaw, speed, acceleration, or the like during any phase of flight. At least a flight maneuver may include a flight plan or sequence of maneuvers to be performed during a flight plan. Aircraft controller may be designed and configured to operate electronic aircraft via fly-by-wire. Aircraft controller is communicatively coupled to each propulsor; as used herein, aircraft controller is communicatively coupled to each propulsor where aircraft controller is able to transmit signals to each propulsor and each propulsor is configured to modify an aspect of propulsor behavior in response to the signals. As a non-limiting example, aircraft controller may transmit signals to a propulsor via an electrical circuit connecting aircraft controller to the propulsor; the circuit may include a direct conductive path from aircraft controller to propulsor or may include an isolated coupling such as an optical or inductive coupling. Alternatively, or additionally, aircraft controller may communicate with a propulsor of plurality of propulsors 104a-n using wireless communication, such as without limitation communication performed using electromagnetic radiation including optical and/or radio communication, or communication via magnetic or capacitive coupling. Vehicle controller may be fully incorporated in an electric aircraft containing a propulsor, and may be a remote device operating the electric aircraft remotely via wireless or radio signals, or may be a combination thereof, such as a computing device in the aircraft configured to perform some steps or actions described herein while a remote device is configured to perform other steps. Persons skilled in the art will be aware, after reviewing the entirety of this disclosure, of many different forms and protocols of communication that may be used to communicatively couple aircraft controller to propulsors. Persons skilled in the art, upon reviewing the entirety of this disclosure, will be aware of various ways to monitor resistance levels and apply resistance to linear thrust control, as used and described herein.

Continuing to refer to FIG. 1, a hover and thrust control assembly 100 includes a linear thrust control 116 mounted on the throttle lever 108. A "linear thrust control", as used herein, is a manually operable bidirectional thrust control restricted to motion about or along a single axis. As a non-limiting example, linear thrust control 116 may include a slider, such as a button control that can be moved in a bidirectional range, along a single axis, between a minimal and maximal range. As further a non-limiting example, linear thrust control 116 may include a lever, where movement is restricted in a bidirectional rotational axis about a fulcrum like the throttle lever 108. As an additional non-limiting example, linear thrust control 116 may include a joystick confined to bidirectional movement, such as a manual transmission control in some modern vehicles. As another non-limiting example, linear thrust control 116 may include a thumbwheel, or any haptic electrical input device, which may control thrust in a linear, bidirectional manner. While the illustrative embodiment of FIG. 1 shows hover and thrust control assembly 100 having throttle lever 108 and linear thrust control 116, in other embodiments, hover and thrust control assembly 100 may have any number of flight control elements.

Figure 3:
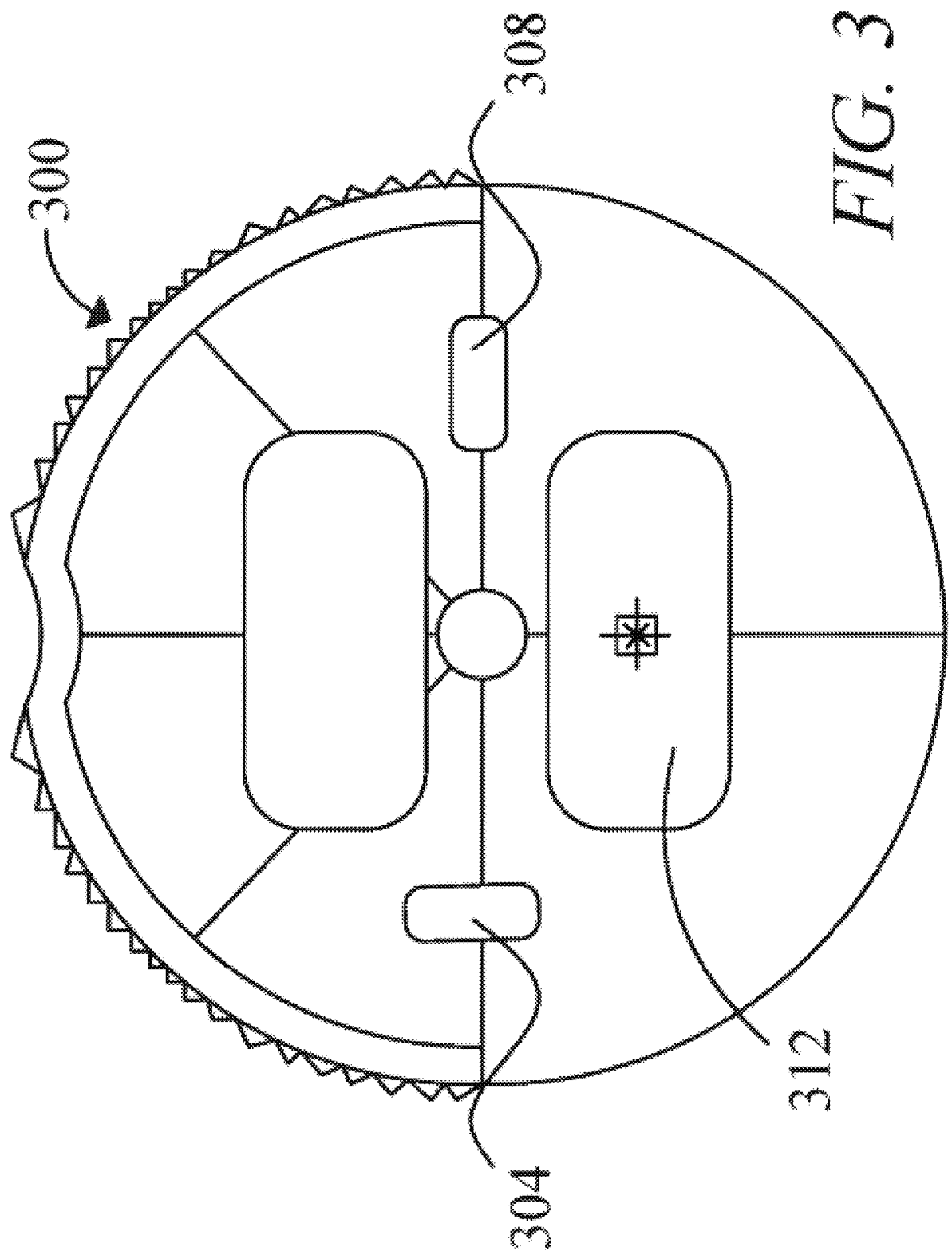
FIG. 3 is a diagrammatic illustration of an exemplary embodiment of a thumbwheel sensor layout.

Referring now to FIG. 3, an exemplary embodiment of linear thrust control 116 is illustrated. Linear thrust control 116 may include a thumbwheel 300 rotatably mounted on throttle lever 108. Linear thrust control 116 thumbwheel 300 may include at least an angular position sensor 304. An "angular position sensor," as used in this disclosure, is an electronic device that measures the angular position and/or change in angular position of an object from a reference position, where "angular position" denotes an amount of rotation, as measured for instance in degrees, radians, or the like, from the reference position; detection may be accomplished by detection of changes in a magnetic field, current, or any other electrical feedback mechanism used in aircraft control. Angular position sensor 304 may include at least a contactless sensor 308. A "contactless sensor," as used in this disclosure is an electronic device that measures angular position, as described above, of an object without being in direct contact with an object. Non-limiting examples of contactless sensor 308 may include sensors that detect and/or measure magnetic flux of a small magnet without contact, such as diametric magnetization sensors, through-hole sensors, above-the-object sensors, end-of-shaft sensors, computing angular information from the vectoral components of the flux density from which an output signal (analogue, PWM, or Serial Protocol) proportional to the angle that is produced. As a further non-limiting example, sensor may include at least a Hall effect sensor 312. A Hall effect sensor 312 may include any device that is used to measure the magnitude of a magnetic field where the output voltage is directly proportional to the magnetic field's strength. A Hall effect sensor 312 may be used for proximity sensing, movement and speed detection, and/or current sensing. Non-limiting examples of Hall effect sensors used for detecting position and movement of wheels or shafts may include sensors used in internal combustion engine ignition timing, tachometers, anti-lock braking systems, and brushless DC electric motors where a Hall effect sensor detects the position of magnetic component, where output voltage of the sensor peaks and decreases as magnetic components move closer or away from the sensor, respectively.

Still referring to FIG. 3, angular position sensor 304 may include a plurality of independent sensors, as described above, where any number of the previously described sensors may be used to detect motion of a thumbwheel 300. Independent sensors, as described above, may include separate sensors measuring the thumbwheel 300 position that may be powered by and/or in communication with circuits independently, where each may signal sensor output to a control circuit such as an aircraft flight control separately. In a non-limiting example, there may be four independent sensors housed in and/or sensing thumbwheel 300 control. In an embodiment, use of a plurality of independent sensors may result in redundancy so that in the event one sensor fails, the ability of assembly 100 to detect motion and/or position of thumbwheel 300 and to regulate thrust of forward propulsor 208 may remain unaffected.

Still referring to FIG. 3, movement of the linear thrust control 116 thumbwheel 300 in a first direction, which may be a forward direction from a perspective of a pilot operating assembly 100, increases forward thrust of a forward thrust propulsor 208. Increasing forward thrust increases electric energy or power to the forward propulsor 208, causing increase in thrust from propulsor, increasing speed and/or acceleration of aircraft. Decreasing forward thrust may be accomplished by decreasing electric energy or power to the forward propulsor 208, which may cause a decrease in thrust from propulsor; thrust may decrease to zero thrust, resulting in a neutral status of propulsor. In a non-limiting example, thumbwheel 300 may be positioned at a neutral position detent where the thumbwheel can be moved in a first and/or second direction when thrust is neutral. In a non-limiting example, moving linear thrust control 116 thumbwheel 300 in a forward direction may generate a command to an aircraft controller to increase forward thrust. In a non-limiting example, of movement of thumbwheel 300 forward to an optimal cruise position may correspond to a maximally efficient power level for forward cruising flight. Further, in a non-limiting example, movement beyond optimal cruise position in first direction may cause at least a forward propulsor to output greater power, permitting greater speed and/or acceleration at a higher cost in energy. Movement of the linear thrust control 116 thumbwheel 300 in a second direction decreases forward thrust of the forward thrust propulsor 208. Decreasing forward thrust may be accomplished by a decrease in electric energy or power to the forward propulsor 208, causing decrease in thrust from propulsor, decreasing speed and/or acceleration of aircraft. In a non-limiting example, moving linear thrust control 116 thumbwheel 300 in a second direction, opposite the first direction, may produce a command to an aircraft controller to perform such decreases. In a non-limiting example, movement of thumbwheel 300 in second direction to an optimal deceleration position may correspond to a maximally efficient power level for deceleration and/or braking. Further, a non-limiting example, movement beyond optimal braking position in second direction may cause at least a forward propulsor to further decrease power, permitting greater deceleration and/or braking at a higher cost in energy. Movement of linear thrust control 116 thumbwheel 300 in second direction may cause at least a forward propulsor to enter into regenerative braking. Regenerative braking, as referred to herein, is an energy recovery mechanism that converts kinetic energy from propulsors into a form that can be either used immediately or stored while braking. Regenerative braking in aircraft represents an energy recovery mechanism whereby kinetic energy from flight is converted into electrical energy, which may be is used and/or stored in an energy storage device such as a battery. Regenerative braking may work by turning the motor into a generator, producing electricity and thus EMF that slows the propulsor, slowing the aircraft. Regenerative braking may involve an electric motor functioning as an electric generator, mechanically coupled and/or electrically coupled to a power source. Energy generated in this manner may be fed back into a power supply, for instance by charging a battery or other energy storage device via a rectifier or other voltage regulation device. Braking effect in regenerative braking may be achieved by electromotive force in the motor as generator resisting reverse rotation of a propulsor such as at least a forward propulsor 208. Further movement of linear thrust control 116 thumbwheel 300 in second direction may cause at least a forward propulsor to reverse, increasing braking effect. This may slow down aircraft more rapidly, at a greater energy cost. In illustrative embodiments, a linear thrust control 116, including in a non-limiting example, a thumbwheel 300, which may control forward thrust, reverse thrust, and regenerative braking by communicating with a flight control computer. Informing a flight control computer via linear thrust control 116 may result in increase or decrease in current to the forward propulsor 204 in electronic aircraft and/or could increase or decrease torque of the forward propulsor 204.

Figure 4:
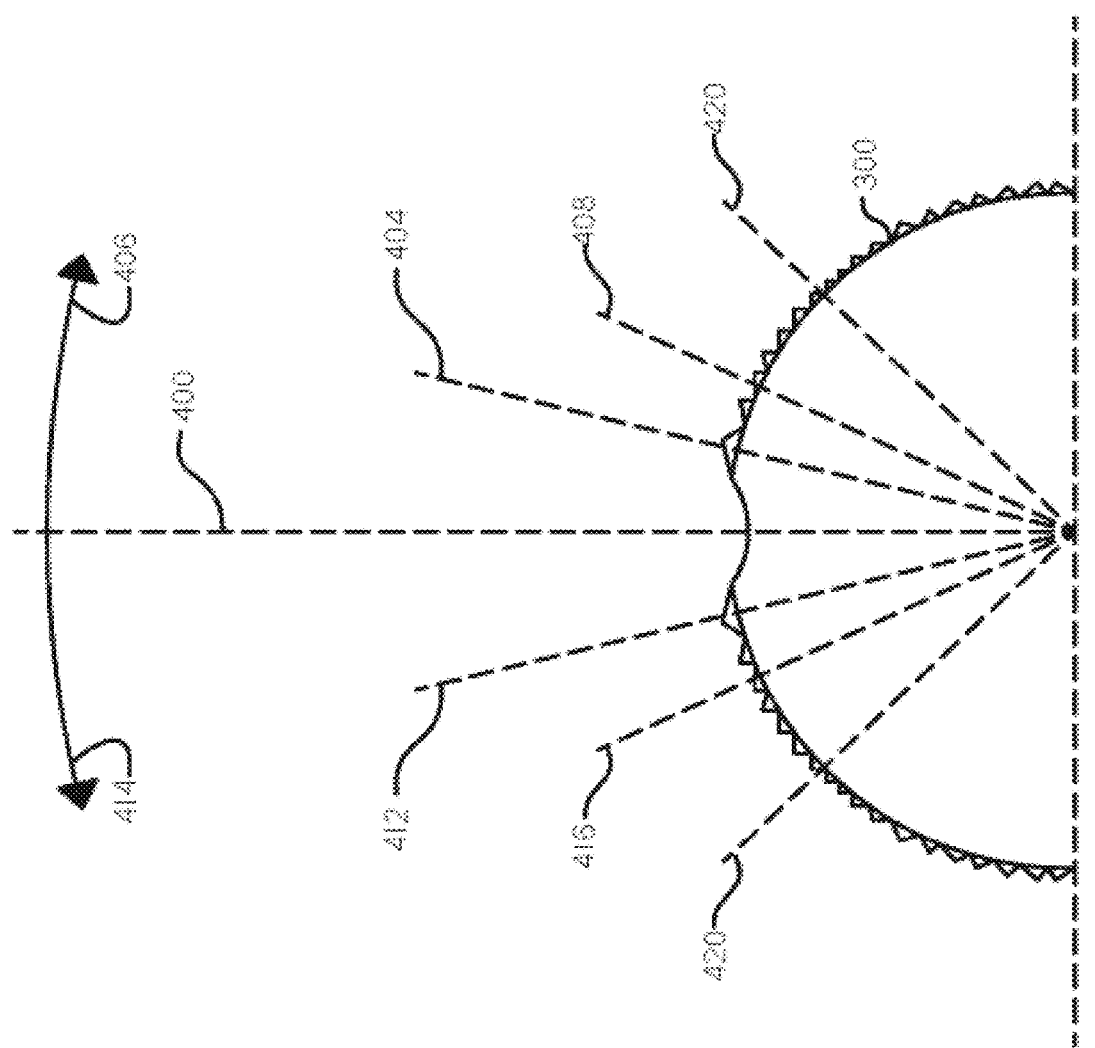
FIG. 4 is a diagrammatic representation of an exemplary embodiment of a linear thrust control thumbwheel.

In reference to FIG. 4, linear thrust control 116 thumbwheel 300, may include at least a detent 400. The function of the detent 400, or catch position on the thumbwheel 300, may be accomplished by an indentation as described in further detail below and/or one or more other mechanisms to resist rotation, haptic feedback, or as a biasing means to at least a position, such as in non-limiting examples, spring mechanism. In non-limiting embodiments, detent 400 may include a neutral position detent 400, where the thumbwheel 300 is biased into the neutral position detent 400, for instance by a spring mechanism, or any biasing means; it should be noted that this may be accomplished without a dedicated detent for neutral position. In non-limiting embodiments, at least a detent may include an optimal cruise position detent 404, in which the thumbwheel 300 is rotated in a first direction 406. In non-limiting embodiments, the thumbwheel may be rotated further in a first direction 406 past an optimal cruise position detent to a high-speed position 408; it should be noted that this may be accomplished without a dedicated detent for a high-speed position. In non-limiting embodiments, thumbwheel 300 may be rotated in a second direction past the neutral position detent 400 to a regenerative braking detent 412. It should be noted that this may be accomplished without a dedicated detent for neutral position. In non-limiting embodiments, thumbwheel 300 may be rotated further in a second direction 414 to a maximal braking position 416; it should be noted that this may be accomplished without a dedicated detent for maximal braking position 416. Thumbwheel 300 may have a biasing mechanism, e.g. a spring mechanism, that urges the position of the thumbwheel 300 from the high-speed position 408 and/or maximal braking position 416 towards the neutral position detent 400. There may be hard stop points 420 in either a first direction 406 or second direction 414. Each thumbwheel 300 position may be communicated to the user, as in a non-limiting example, by at least an indentation of the thumbwheel, which may communicate positioning or thumbwheel in one or more detent or other positions as described herein, for instance by use of a corresponding dip in the thumbwheel housing of the thumbwheel such as an indentation or notch, so that the thumbwheel housing dip and thumbwheel indentation lining up may provide further feedback, for instance, by a click, haptic feedback, or the like.

Still referring to FIG. 3, thumbwheel 300 may have positions additional to those corresponding to the at least a detent 400. For instance, in an embodiment, thumbwheel 300 may be rotated from the optimal cruise detent further in the first direction to a high-speed position. Highspeed position may lack a detent. In an embodiment, linear thrust control 116 may include a biasing means, such as a spring mechanism, that urges the thumbwheel 300 from the high-speed position to the optimal cruise detent; alternatively. In illustrative embodiments, linear thrust control 116 thumbwheel 300 may be rotated from the regenerative braking detent further in a second direction to a maximal braking position. Maximal braking position may lack a detent. In an embodiment, linear thrust control 116 may include a biasing means that urges the thumbwheel 300 from the regenerative braking detent to the maximal braking position; alternatively, the biasing means may urge the thumbwheel from the maximal braking position to the regenerative braking detent. Biasing means may be anything suitable for biasing means as described above. It is important to note, in a non-limiting example, a thumbwheel may be rotated to a maximal braking position to decrease speed of an aircraft and, in some instances, such as when the aircraft has been slowed to a stationary position on the ground, may potentially reverse direction of an aircraft, for instance, for purposes of taxiing.

In an embodiment, and referring again to FIG. 1, linear thrust control 116 may include a resistance mechanism 112 that generates a force resisting rotation of thumbwheel 300; resistance mechanism 112 may include any device suitable for use as a resistance mechanism 112 of throttle lever as described above. Resistance mechanism 112 may be variable; for instance, resistance mechanism 112 may be configured so that force resisting rotation of a thumbwheel 300 increases as throttle lever 108 is moved in first direction and/or decreases as a throttle lever 108 is moved in second direction. As a non-limiting example, resistance of resistance mechanism in throttle lever 108 may increase when linear thrust control 116 is moved in first direction and decrease when linear thrust control 116 is moved in second direction, or vice-versa. As a non-limiting example, resistance of resistance mechanism in linear thrust control 116 may increase when throttle lever 108 is moved in first direction and decrease when throttle lever 108 is moved in second direction. Increasing throttle lever 108 or a linear thrust control 116 may cause resistance in increasing the diametrically opposed control. Detection of thumbwheel 300 and throttle lever 108 may be detected by at least an angular sensor, as described above, any logic circuit and/or processor as described in this disclosure may be used to detect motion of other components, triggering the increase and/or decrease in resistance.

In illustrative embodiments, further in reference to FIG. 1, assembly 100 may include a battery shut-off switch 120 and/or any device suitable for use as a control for battery operation during flight. In illustrative embodiments, dual-mode aircraft 200 may include at least an energy source providing electric energy to the at least a vertical propulsor 204 and/or forward propulsor 208. At least an energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a capacitor, an inductor, and/or a battery. Battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, or any other suitable battery. Persons skilled in the art, upon reviewing the entirety of this disclosure, will be aware of various devices of components that may be used as at least an energy source. Hover and thrust control assembly 100 may include multiple propulsion sub-systems, each of which may have a separate energy source powering a separate at least a vertical propulsor 204 and/or forward propulsor 208. As a non-limiting example, any number of battery shut-off switch 120 may be utilized; in non-limiting illustrative embodiments, two battery shut-off switches 120 are described. There may be a battery shut-off switch 120 per energy source. Battery shut-off switch 120 may shut-off energy source when activated. When an energy source is shut-off, circuitry may reroute power from other energy sources to components that were powered by the energy source.

In illustrative embodiments, further in reference to FIG. 1, battery shut-off switch 120 may include a switch guard 124 to aid in controlled, deliberate cessation of battery and/or energy source function while avoiding incidental interruption during operation. In illustrative embodiments, including without limitation, two guarded battery shut-off switches 112 may be included in the assembly 100, corresponding to two energy sources and/or batteries; this may allow for redundancy so that a second battery and/or energy source may remain functional in the event a first battery and/or energy source fails. Switch guard 124 may be placed on switches in aircraft, for instance, for fire bottle discharge switches, ditch switches, emergency locator transmitter (ELT) switches, and EV AC switches, or any button, switch, or control that requires protection. Switch guard 124 may include, as non-limiting examples, flip cover, spring-loaded guard, lever bars, or any mechanism meant to protect a button, switch, or control.

In illustrative embodiments, and still referring to FIG. 1, hover and thrust control assembly 100 may include battery failure indicator 128, which may inform the use and/or status of the switch guard 124 and battery shut-off switch 120. Battery failure indicator 128 may use, as a non-limiting example, light-emitting diode (LED), backlit incandescent bulb or LED, needle cluster, gauge, etc., that may be electronically connected via a circuit to battery shut-off switch 120, guard 124, and battery, or any electronic motor, electric charging/storage device used by an aircraft as previously described. In non-limiting examples, the battery failure indicator 128 may be located at one or more additional locations, such as without limitation as part of the annunciator panel of an aircraft. Further, in non-limiting examples, hover and thrust control assembly 100 may include at least one battery failure indicator 128, in illustrative embodiments, two battery failure indicator 128 are present for redundancy; any number of battery failure indicator 128 may be used. Indicator light 128 may be connected to circuitry that detects conditions requiring shutoff, such as runaway temperature of battery, surges in current indicative of short-circuit, etc. A battery shut-off switch 120 may be used if regenerative braking, or any other maneuver, represents a charging hazard; a battery failure indicator 128 may be used to signal a charging hazard for a particular battery.

Figure 5:
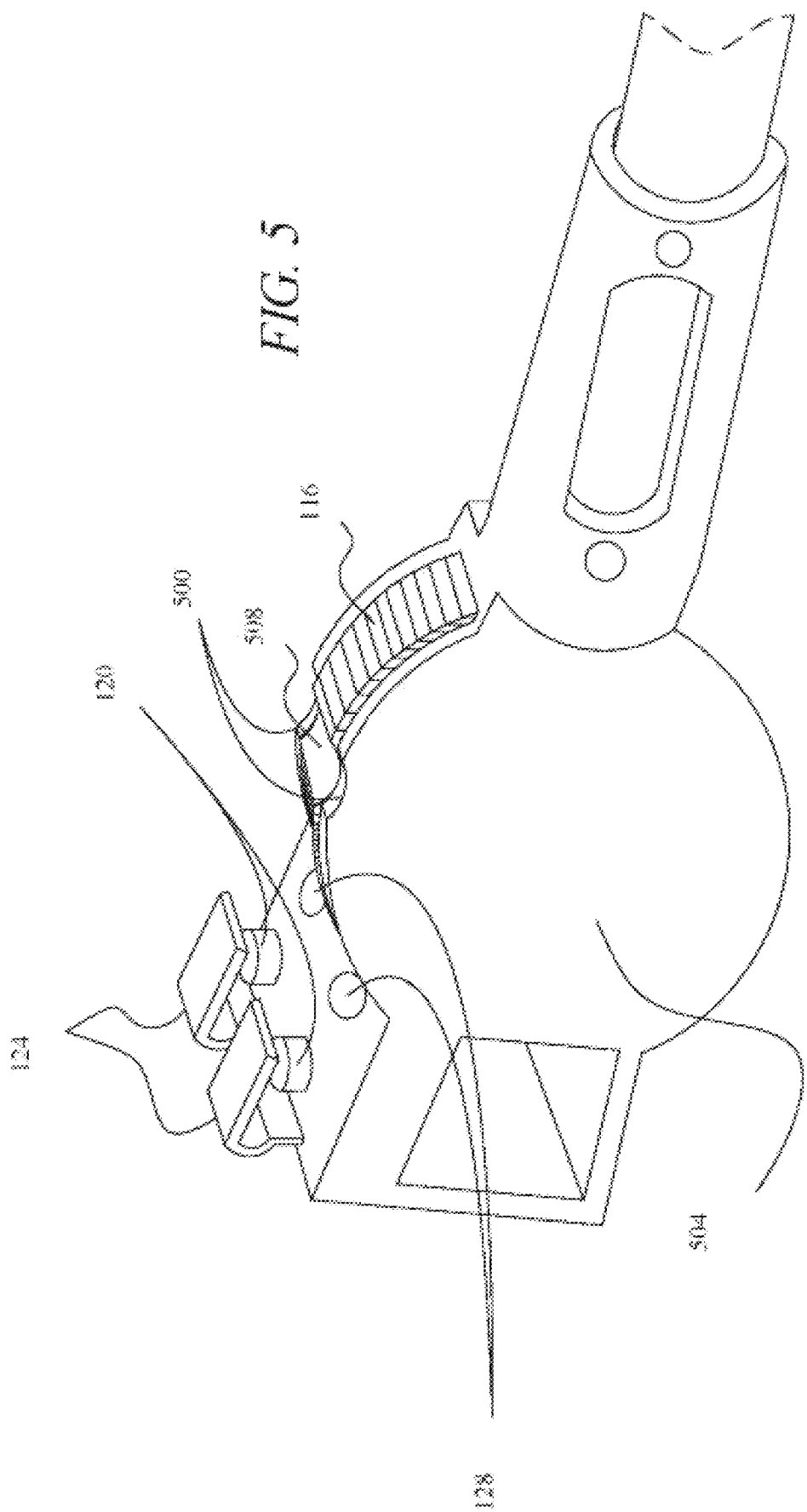
FIG. 5 illustrates an exemplary embodiment of a hover and thrust control assembly.

Referring to FIG. 5, an exemplary embodiment of assembly 100 and thumbwheel 300 as described above, with thumbwheel rotated in a first direction 406, where a dip 500 in the upper edge of the thumbwheel housing 504 may line up with thumbwheel indentation 508. In non-limiting examples, thumbwheel 300 surface may be flush with the thumbwheel housing 500, or thumbwheel 300 surface may be raised above the thumbwheel housing 500.

A pilot operating or a user otherwise controlling an aircraft capable of vertical and horizontal thrust may be required to control not only hover and thrust but also the aircraft's three-dimensional ("3D") heading. As described above, a 3D control assembly may receive a certain manipulation by a pilot or operator and can be configured translate that manipulation into electronic signals that may in turn be configured to control the aircraft. In addition to the above-disclosed system of control hover and thrust, a system for controlling aircraft direction is also provided herein.

In practical real-world situations, a pilot, either remotely or onboard a dual-mode aircraft, may be required to coordinate the above and below-disclosed systems to fully control a dual-mode aircraft in the entirety of its designed flight envelope. In a non-limiting example embodiment, a pilot may manipulate the hover and thrust control with one hand by a hover and thrust control assembly, while simultaneously manipulating the 3D control assembly with the other hand by three-dimensional directional control assembly. This non-limiting example serves to illustrate that simultaneous interaction with both control systems can be used for control of the aircraft, whether that is accomplished physically or remotely through wired or wireless electronic control. The 3D control assembly disclosed hereinbelow may be designed and implemented for integration in a dual-mode aircraft with the hover and thrust control system. The integration of these systems may comprise, in an embodiment, an electronics suite configured to receive all electrical control signals from these two control systems and translate those signals into aircraft manipulation. This translation of the plurality of signals from a plurality of control systems may comprise adjusting power or direction based on the input of the other. In a non-limiting example, an input by a pilot to change directional heading may require a dual-mode aircraft to adjust power output in one or more propulsors.

Aspects of the present disclosure combine a 3D control assembly for a dual-mode aircraft system. In an embodiment, the assembly may provide a user with the ability to control directional movement of an aircraft by use of a control stick. The control stick may be mechanically coupled to at least a portion of the aircraft and be configured to receive manual inputs from a user. Further, the control stick can be configured to translate said inputs into electronic signaling that is configured to control the aircraft. In embodiments, the control stick can be configured to be directionally and/or rotationally manipulated. Further, the control stick can be configured to be rotationally manipulated in an asymmetric fashion. In embodiments, the control stick may be mounted on a support structure which may include an armrest and vibrational dampening configured to reduce user fatigue and user-induced error. In embodiments, input devices may be disposed along, on, or in the control stick, precluding the necessity for a user to remove a hand from the control stick to accomplish interaction with aircraft functions.

Figure 6A:
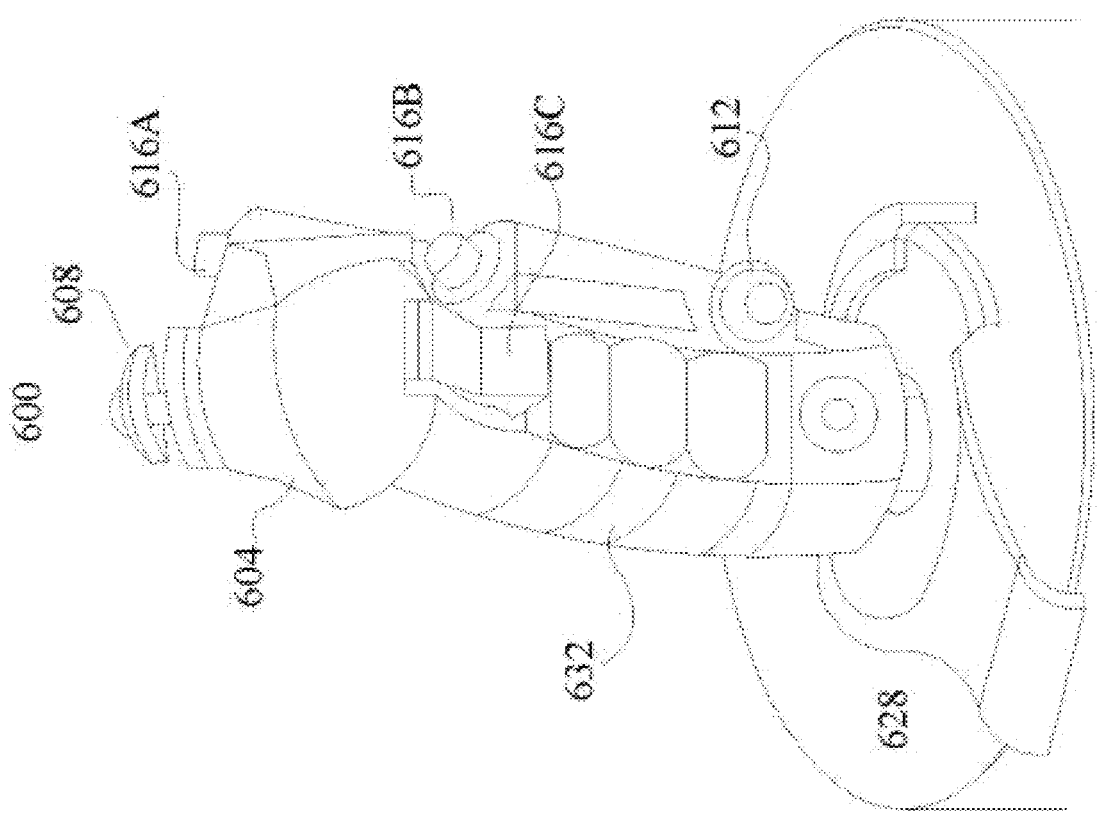
FIG. 6A is an isometric view illustrating a first perspective of a three-dimensional directional control assembly stick, according to some embodiments.
Figure 6B:
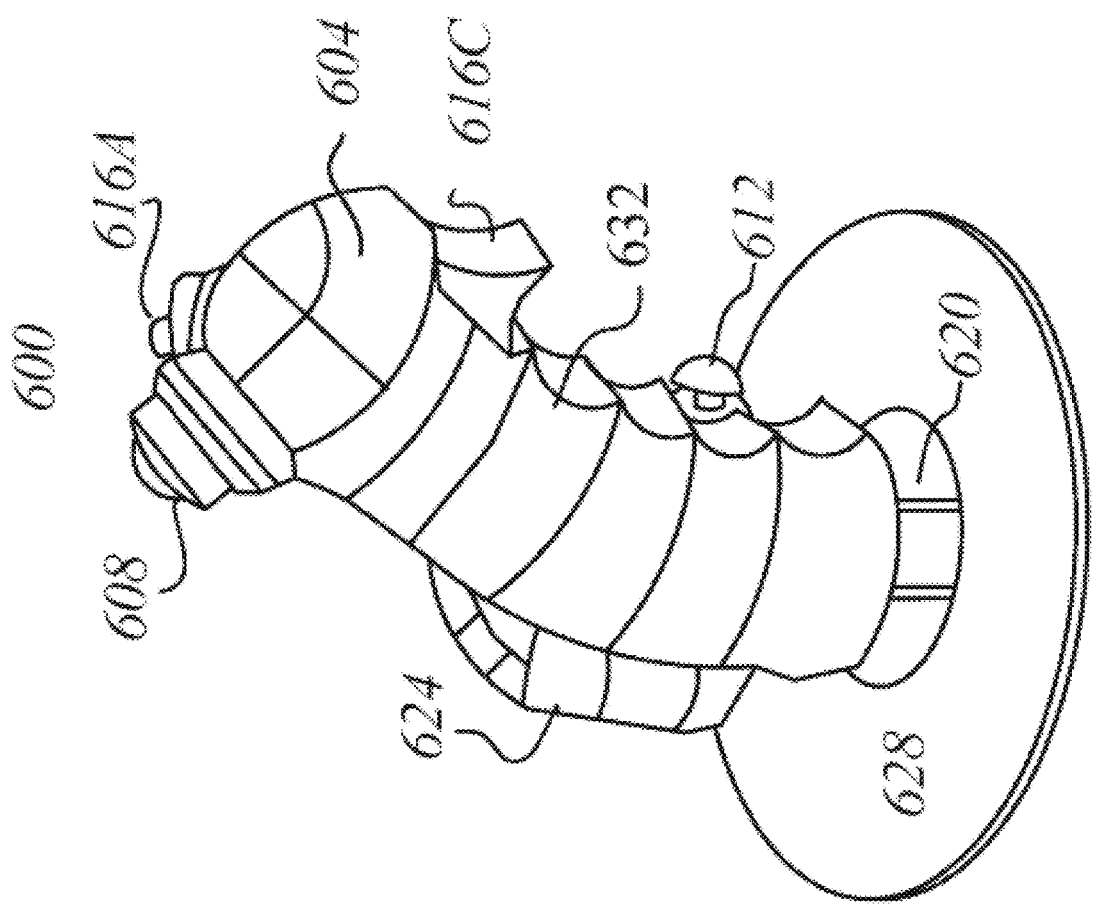
FIG. 6B is an isometric view illustrating a second perspective of a three-dimensional directional control assembly stick, according to some embodiments.

Referring now to FIGS. 6A-B, an example embodiment of 3D directional control stick assembly 600 is illustrated. In embodiments, 3D directional control stick assembly may be implemented in aircraft 620 and can be configured to control the pitch, yaw, and roll the aircraft according to manual inputs received by assembly 600. 3D directional control stick assembly 600 can include control stick 604, first interface device 608, second interface device 612, at least an aircraft control interface device 616, palm lever 624, control stick base 628, grip 632, or any combination thereof.

With continued reference to FIGS. 6A-B, in an embodiment, control stick 604 can comprise a shape having a radius and first and second opposite, opposing ends disposed a length away from one another. Said shape may be, for example, cylindrical, polygonal, spherical, prismatic, or any shape having an extruded cross section configured to be manipulated by a user. Control stick 604 may be comprised of any of number of suitable materials, elements, alloys, polymers, and plastics configured to withstand interaction and manipulation by a user. For example, control stick 604 may comprise, but is not limited to, aluminum, steel, High Density Polyethylene (HDPE), carbon fiber, or any combination thereof. According to embodiments, control stick 604 can include ergonomic features, such as grip 632. Grip 632 can include, but is not limited to, knurling, ridges, perforations, scallops, edges, fillets, radii, any combination thereof, disposed on control stick 604. Persons skilled in the art, upon reviewing the entirety of this disclosure, will be aware of various ergonomic features which may be used as grip 632 as described in the entirety of this disclosure.

Continuing to refer to FIGS. 6A-B, in an embodiment, control stick 604 can be mechanically coupled to aircraft 620. For example, a first and/or second send end of control stick 604 can be mechanically coupled to a support structure within aircraft 620 and/or to the frame of aircraft 620. In embodiments, control stick 604 is coupled to aircraft 620 such that control stick 604 is configured to be rotationally and/or directionally manipulated to a degree by a user. As used herein, a person of ordinary skill in the art would understand "mechanically coupled" to mean that at least a portion of a device, component, or circuit is connected to at least a portion of the aircraft via a mechanical coupling. Said mechanical coupling may include, as non-limiting examples, rigid coupling (e.g. beam coupling), bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling can be used to connect the ends of adjacent parts and/or objects of an aircraft. Further, in an embodiment, mechanical coupling may be used to join two pieces of rotating electric aircraft components.

Still referring to FIGS. 6A-B, control stick 604 can be mechanically coupled at a first end to a support structure through control stick base 628. A "control stick base" as used in this disclosure, is a component coupled to a first end of control stick 604, wherein said component is the interface by which control stick 604 is coupled to the support structure. That is to say, control stick base 628 may be configured to couple control stick 604 to a support structure. The nature of this coupling, which may be any or a combination of those stated above, is configured to allow control stick 604 to be manipulated in a plurality of directions, which may be understood by someone of ordinary skill in the art to be characterized by a horizontal plane as well as rotationally about its length axis (e.g. the vertical axis). The coupling of control stick 604 to control stick base 628 can further be configured to allow control stick 604 to be constantly manipulated by user and simultaneously rotated and moved according to user.

Continuing to refer to FIGS. 6A-B, in an embodiment, control stick 604 may be configured to rotate about its length axis asymmetrically. Asymmetric rotation comprises a differing angle of rotation depending on direction of rotation. The angle of rotation can be measured in degrees, radians, or a like measurement system. According to embodiments, the movements of the control stick by user manipulation, with no limitation to type of manipulation, produces electronic signals. These electronic signals can be carried and processed by circuitry and may be used to control the motion of aircraft 620 in three dimensions. In embodiments, these motion controls can include the pitch, roll, and yaw angle of aircraft 620.

With continued reference to FIGS. 6A-B, 3D directional control assembly 600 is further configured to include a first interface device 608. A "first interface device" as described herein, is an input device, wherein the device is configured to receive an interaction from a user and enable a thrust element to spin as a function of the interaction from a user. An "interaction" as used herein can comprise, but is not limited to, a depression, a toggle, a rotation, a button press, a gesture, a click, any combination thereof. In an embodiment, the first interface device 608 may be disposed on control stick 604 in any user reachable location, wherein a user reachable location of control stick 604 is a location in which the user can reach first interface device 608 with a fingertip while the user is in contact with control stick 604. For example and without limitation, an input device may include buttons, sliders, wheels, toggles, triggers, touch screens—or any combination thereof—as well as any other form of input device configured to receive an interaction. Persons skilled in the art, upon reviewing the entirety of this disclosure, will be aware of various input devices which may be used as first interface device 608 as described in the entirety of this disclosure. A thrust element may include any device or component that converts mechanical energy of a motor, for instance in the form of rotational motion of a shaft, into thrust within a fluid medium. A thrust element may include, without limitation, a device using moving or rotating foils, including without limitation one or more rotors, an airscrew or propeller, a set of airscrews or propellers such as contra-rotating propellers, a moving or flapping wing, or the like. A thrust element may include without limitation a marine propeller or screw, an impeller, a turbine, a pump-jet, a paddle or paddle-based device, or the like. As another non-limiting example, a thrust element may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as a thrust element.

Still referring to FIGS. 6A-B, 3D directional control assembly 600 is further configured to include a second interface device 612. A "second interface device" as described herein, is an input device configured to receive an interaction from a user and disable the thrust element as a function of the interaction from a user. The input device may include any input device, as described in the entirety of this disclosure. The interaction may include any interaction as described in this disclosure. For example and without limitation, an interaction may include a depression, a toggle, a rotation, a button press, a gesture, a click, or any combination thereof. In an embodiment, second interface device 612 may be disposed on control stick 604 in any location wherein the user must reach around control stick 604 to interact with the second interface device 612. For example, second interface device 612 may be disposed on control stick 604 in a location outside the reach of a user's fingertips when the user is in contact with control stick 604. In another embodiment, the second interface device 612 may be disposed in any location on aircraft 620, wherein the user has to reach around control stick 604 to interact with the second interface device 612. For example, second interface device 612 may be disposed in aircraft 620 in a location outside the reach of a user's fingertips when the user is in contact with control stick 604. Persons skilled in the art, upon reviewing the entirety of this disclosure, will be aware of various input devices which may be used as second interface device 612 as described in the entirety of this disclosure Continuing to refer to FIGS. 6A-B, 3D directional control assembly 600 can further include aircraft control interface devices 616A-C disposed in, on, and/or separate from control stick 604. An "aircraft control device" as described herein, is an input device, wherein the device is configured to receive an interaction from a user and adjust an aircraft function as a function of the interaction from the user. For example and without limitation, adjusting an aircraft function as a function of the interaction with the user may include adjusting the autopilot function of aircraft 620 as a function of an interaction from a user, wherein adjusting may include enabling and/or disenabling the autopilot function. As a further example and without limitation, adjusting the aircraft function as a function of the interaction with the user may include adjusting the radio function of aircraft 620, wherein adjusting may include enabling and/or disenabling the radio functionality. As a further non-limiting example, adjusting the aircraft function as a function of the interaction with the user may include adjusting the trim of aircraft 620, wherein adjusting the trim may include engaging and/or disengaging the trim. Persons skilled in the art, upon reviewing the entirety of this disclosure will be aware of various aircraft functions that may be adjusted utilizing aircraft control interface device 61 6A-C. The input device may include any input device, as described in the entirety of this disclosure. The interaction may include any interaction as described in this disclosure. For example and without limitation, an interaction may include a depression, a toggle, a rotation, a button press, a gesture, a click, or any combination thereof. In embodiments, control stick 604 may include any number of aircraft control interface devices 616 disposed thereon. In an embodiment, aircraft control interface device 61 6A-C may be disposed on control stick 604 in any user reachable location, wherein a user reachable location of control stick 604 in a location wherein the user can reach aircraft control interface device 616A-C with a fingertip while the user is in contact with control stick 604. While in FIGS. 6A-B, only three aircraft control interface devices 616 are shown, one of ordinary skill in the art will appreciate that 3D directional control assembly 600 may include any number of aircraft control interface device(s) 616.

Still referring to FIGS. 6A-B, in an embodiment, 3D directional control assembly 600 may include palm lever 624 disposed on control stick 604. In embodiments, palm lever 624 is configured to assist a user in rotation of control stick 604. Palm lever 624 may be disposed between the first and second ends of control stick 604 and can be configured to ergonomically capture a user's palm. One of ordinary skill in the art would recognize the mechanical advantage provided by said lever in twisting the control stick 604 about its length axis. In embodiments, one or more interface device(s) 608 may be disposed in or on palm lever 624.

Figure 7:
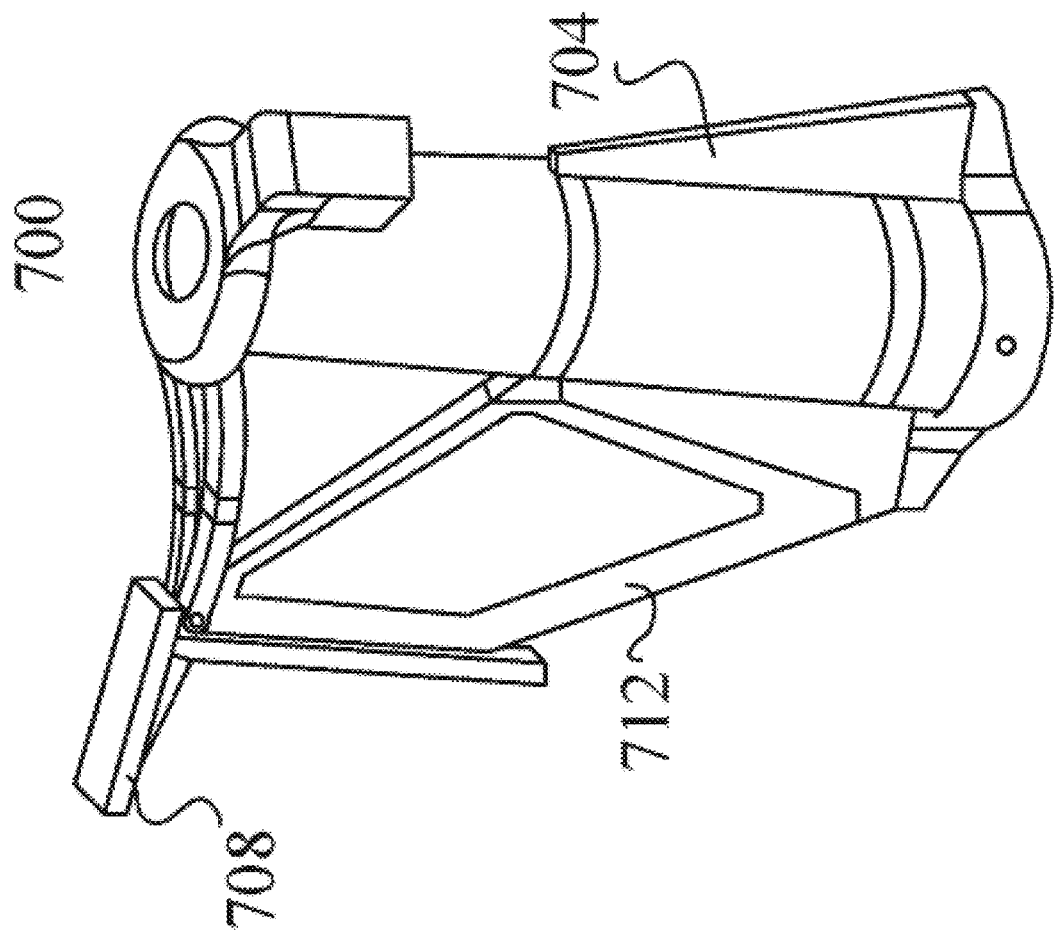
FIG. 7 is an isometric view illustrating a mounting structure, according to embodiments.

As discussed above with reference to FIG. 6A, 3D directional control assembly 600 can include control stick 604 mechanically coupled 620 to a support structure, such as by control stick base 628. Referring now to FIG. 7, an isometric view of mounting structure 700 is presented. In embodiments, mounting structure 700 is configured to mount control stick 604 to aircraft 620, such as to the frame of aircraft 620, wherein mounting control stick 604 mechanically couples control stick 604 to aircraft 620. According to embodiments, mounting structure 700 can include support structure 704, arm rest 708, and vibration dampening feature 712.

Still referring to FIG. 7, support structure 704 can comprise a structing having one or more shapes, the totality of which has a first end coupled to control stick 604 and a second, opposite end coupled to aircraft 620. The support structure 704 can comprise any number of tubes, bars, extrusions, struts, straps, forgings, castings, additively manufactured components fastened together in any combination and orientation. The fastening of aforementioned structural elements that comprise support structure 704 can comprise bolts, buts, screws, dowels, hook and loops, slots, channels, epoxy type bonding, a combination thereof, or another method not mentioned herein. The coupling can include any of the previously mentioned mechanical coupling systems as discussed above with reference to FIGS. 6A-B. In embodiments, control stick 604 is coupled to support structure 704, wherein control stick 604 may be manipulated by the user in a plurality of directions and also rotationally about its length axis. Support structure 704 may be constructed of any suitable material or combination of materials, including without limitation, metal (such as aluminum, titanium, steel, and/or the like), polymer materials or composites (such as fiberglass, carbon fiber, wood), plastics such as high-density polyethylene (HDPE), acrylonitrile-butadiene-styrene (ABS), polyvinyl chloride, polystyrene, or any combination thereof. For example, support structure 704 may be constructed from an additively manufactured polymer material having a carbon fiber exterior. Further, for example, support structure 704 may comprise aluminum parts or other elements that may be enclosed for structural strength, or for purposes of structural support for instance, withstanding vibration, torque, or shear stresses imposed by forces acting upon it.

Continuing to refer to FIG. 7, mounting structure assembly 700 may include arm rest 708 coupled to support structure 700. Arm rest 708 may be coupled to support structure 700 utilizing any method of mechanically coupling and/or fastening methods as described in the entirety of this disclosure. Arm rest 708 can be configured to receive the arm of a user such that it functions as a place for a user to rest an arm during use of 3D directional control assembly 600. Armrest 708 may comprise the same or similar structural materials and fastening methods as the support structure 704. Persons skilled in the art, upon reviewing the entirety of this disclosure, will be aware of various elements and/or components that may be used as arm rest 708, as used and described in this disclosure.

With continued reference to FIG. 7, mounting structure assembly 700 may include vibration dampening element 712. Vibration dampening element 712 can comprise one or more structural elements such as struts, braces, and the like. The structural elements may be fastened utilizing any mechanism as described in the entirety of this disclosures. The structural elements can be arranged such that the vibrations of support structure 704, control stick 604, and arm rest 708 are dampened. Further, the structural elements can each comprise one or more materials configured to reduce vibration such as high-strength, low-weight metals like aluminum or titanium. Likewise, the orientation, shape, fastening method and or material combination of the structural elements may contribute to vibration dampening. In this way, vibration dampening element 712 achieves a reduction in user fatigue and error induced by user oscillation due to vibrations from travel. Persons skilled in the art, upon reviewing the entirety of this disclosure, will be aware of various elements and/or components that may be used as vibration dampening element 712, as used and described in this disclosure.

Figure 8:
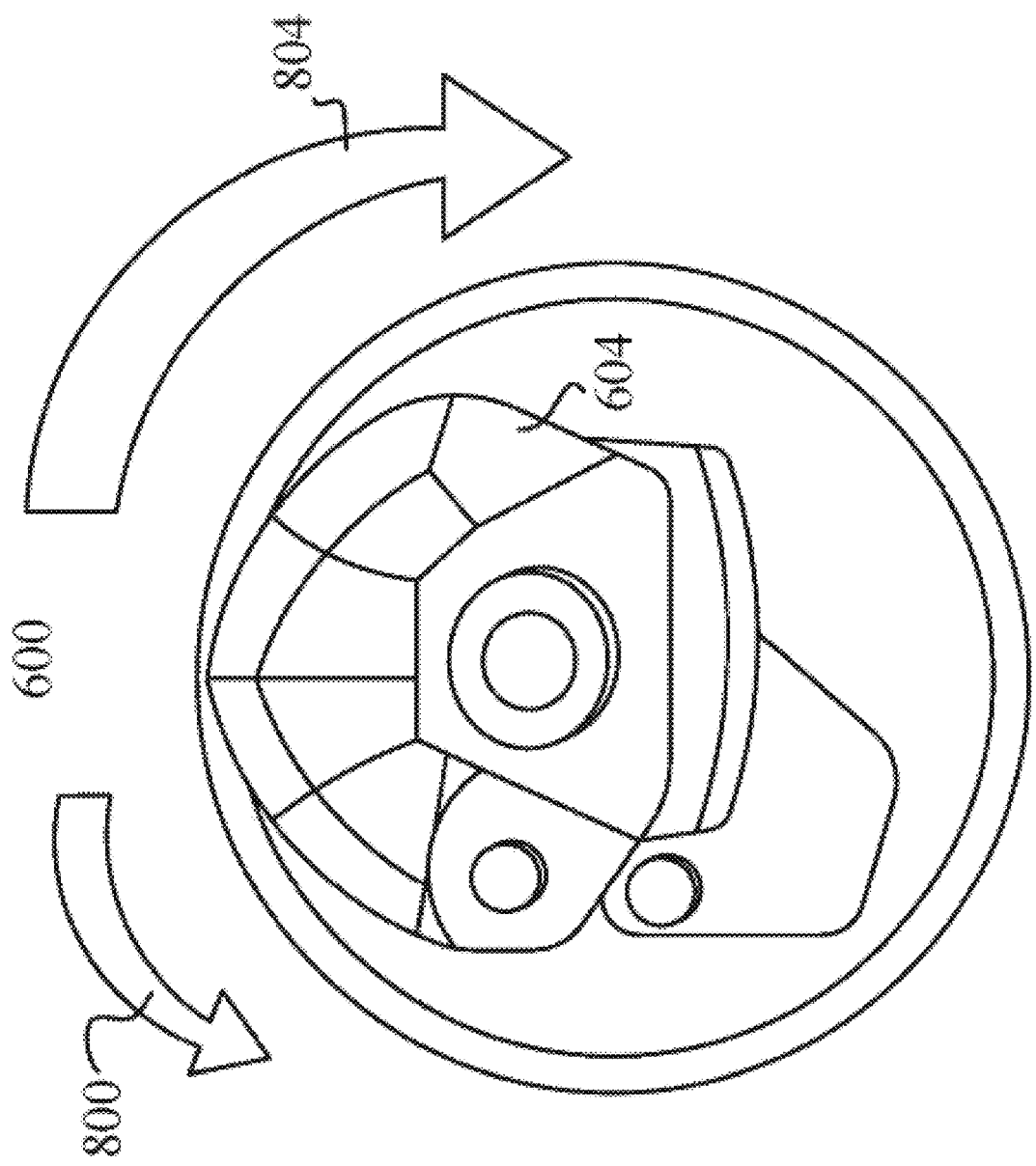
FIG. 8 is a top-down view illustrating an asymmetrically rotatable control stick, according to embodiments.

Referring now to FIG. 8 a top-down view of 3D directional control assembly 600 is provided to demonstrate asymmetrical rotation of control stick 604. 3D directional control assembly 600 includes control stick 604, as described above in further detail in reference to FIGS. 6A-B. Control stick 604 is configured to rotate about its length axis, which one of ordinary skill in the art would understand to be the imaginary axis in and out of FIG. 8.

With continued reference to FIG. 8, control stick 604 can be manipulated by a user in a plurality of directions, including but not limited to, rotationally about its length axis. The rotation of control stick 604 about the length axis can be asymmetric in nature. For example, the asymmetrical rotation of control stick 604 is configured to allow the user to twist control stick 604 to differing amounts/degrees depending on the direction of twist. Further, control stick 604 can be configured to send electronic signals generated from the asymmetrical twisting. For example, the asymmetrical rotation of control stick 604 is configured to allow the user to twist control stick 604 a greater number of degrees in one direction than the other to compensate for a user's wrist flexibility. For example, a greater quantity of twist of control stick 604 in a first direction 800 may correspond to a certain degree change in aircraft yaw in a first direction compared to nose heading. A lesser quantity of twist of the control stick 604 in a second direction 804 may correspond to an equal but opposite change in aircraft yaw in a second direction compared to nose heading to compensate for wrist flexibility. Because the human wrist is more flexible in one direction than the other when grasping a control stick 604 along its axis, asymmetric twist of control stick 604 allows for the differing range of motion in two directions to equally and optimally control the aircraft. As such, asymmetric rotation of control stick 604 givens equal positive and negative signals to aircraft control surfaces by differing amounts of positive and negative angles (i.e. asymmetric) twist of control stick 604. It should be noted that this characterization of direction is exemplary only, and in no way limits the control functionality of the control stick 604, the aircraft, or its associated control surfaces.

Still referring to FIG. 8, control stick 604 can be configured to twist and generate electronic signals, which may travel and transform through relevant circuitry as discussed later in this disclosure to control surfaces of aircraft in one or both of its two main modes of locomotion. These electronic signals can be translated to aircraft control surfaces. These control surfaces, in conjunction with forces induced by environment and propulsion systems, are configured to move the aircraft through a fluid medium, an example of which is air. A "control surface" as described herein, is any form of a mechanical linkage with a surface area that interacts with forces to move an aircraft. A control surface may include, as a non-limiting example, ailerons, flaps, leading edge flaps, rudders, elevators, spoilers, slats, blades, stabilizers, stabilators, airfoils, a combination thereof, or any other mechanical surface are used to control an aircraft in a fluid medium. Persons skilled in the art, upon reviewing the entirety of this disclosure, will be aware of various mechanical linkages that may be used as a control surface, as used and described in this disclosure.

Figure 9:
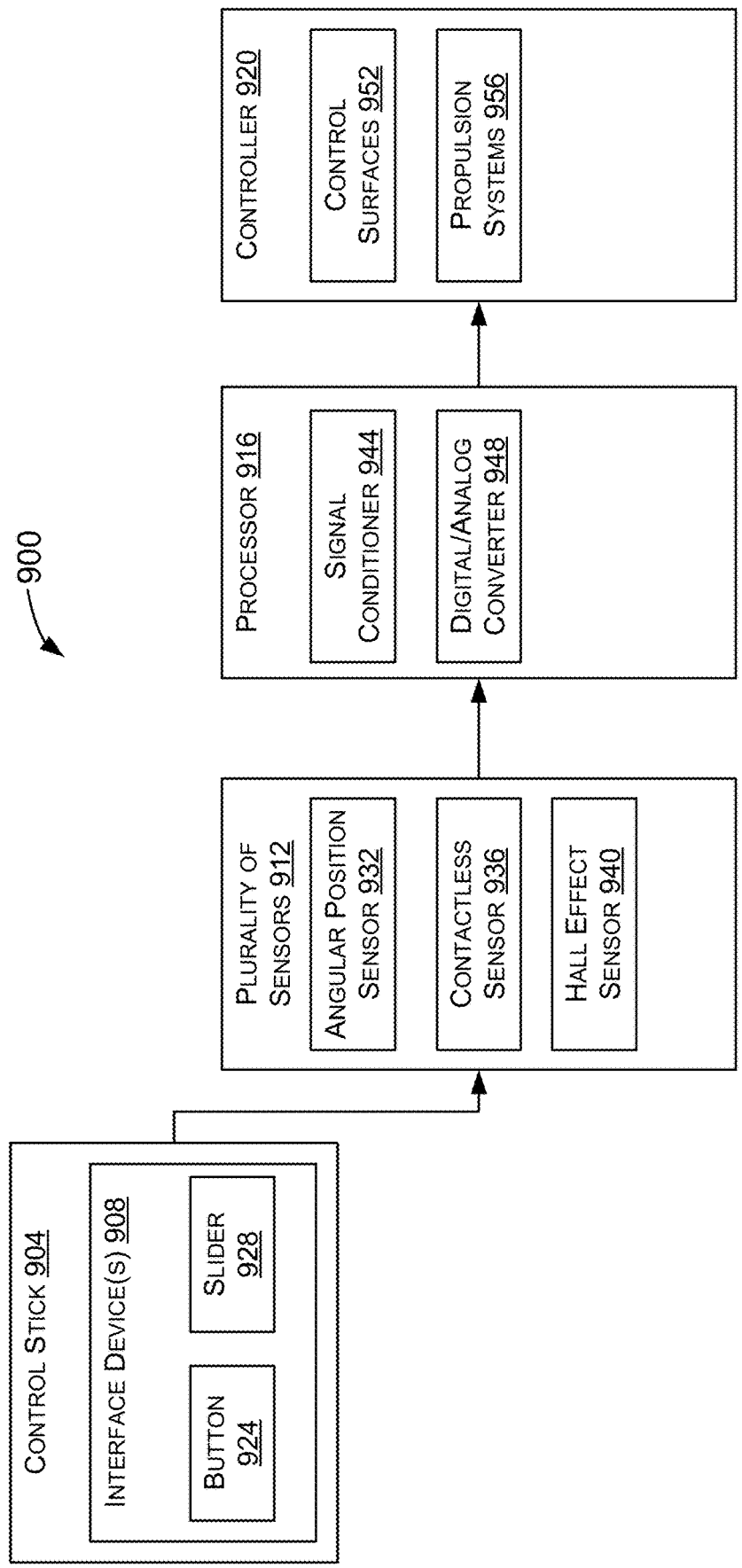
FIG. 9 is a block diagram illustrating a control system for an eVTOL, according to embodiments.

Referring now to FIG. 9, a block diagram illustrating control system 900 for an eVTOL is presented. In an embodiment, control system 900 is configured to control the direction, pitch, yaw, and rotation of an eVTOL and can include control stick 904, interface devices 908 (including, for example, button 924 and slider 928), sensor suit 912 (including, for example, angular position sensor 932, hall effect sensor 936, and contactless sensor 940), processor 916 (including, for example, signal conditioner 944 and digital/analog converter 948), control 920 (including control surfaces 952 and propulsion systems 956), or any combination thereof.

Continuing to refer to FIG. 9, control stick 904 may include any control stick as described in the entirety of this disclosure, wherein the control stick is a graspable control stick rotatably coupled to a support structure. For example and without limitation, control stick 904 may be similar or the same as control stick 604. In embodiments, control stick 904 can be configured to include interface device(s) 908. Interface device 908 may include first interface device 608, second interface device 612, aircraft control interface devices 616, and/or any other interface device as described in the entirety of this disclosure. Control stick 904 and/or interface device 908 may be electronically coupled to a plurality of sensors 912. The plurality of sensors 912 may include sensors that can measure deflection and/or twist of control stick 904. In an embodiment, the plurality of sensors 912 may measure any parameter associated with control stick 904.

Still referring to FIG. 9, in embodiments, plurality of sensors 912 includes angular position sensor 932. An "angular position sensor," as used in this disclosure, is an electronic device that measures the angular position and/or change in angular position of an object from a reference position, where "angular position" denotes an amount of rotation, as measured for instance in degrees, radians, or the like, from the reference position. In an embodiment, detection may be accomplished by detection of changes in a magnetic field, current, or any other electrical feedback mechanism used in aircraft control. In embodiments, plurality of sensors 912 may include contactless sensor 936. A "contactless sensor," as used in this disclosure is an electronic device that measures angular position, as described above, of an object without being in direct contact with an object. Non-limiting examples of contactless sensor 936 may include sensors that detect and/or measure magnetic flux of a small magnet without contact, such as diametric magnetization sensors, through-hole sensors, above-the-object sensors, end-of-shaft sensors, computing angular information from the vectoral components of the flux density from which an output signal (analogue, PWM, or Serial Protocol) proportional to the angle that is produced. According to embodiments, plurality of sensors 912 may include Hall effect sensor 940. Hall effect sensor 940 may include any device that is used to measure the magnitude of a magnetic field where the output voltage is directly proportional to the magnetic field's strength. Hall effect sensor 940 may be used for proximity sensing, movement and speed detection, and/or current sensing. Non-limiting examples of Hall effect sensors used for detecting position and movement may include sensors used in internal combustion engine ignition timing, tachometers, anti-lock braking systems, and brushless DC electric motors where a Hall effect sensor detects the position of magnetic component, where output voltage of the sensor peaks and decreases as magnetic components move closer or away from the sensor, respectively.

Continuing to refer to FIG. 9, plurality of sensors 912 may include a plurality of independent sensors, as described above, where any number of the previously described sensors may be used to detect motion of control stick 904. Independent sensors, as described above, may include separate sensors measuring the position of control stick 904 that may be powered by and/or in communication with circuits independently, where each may signal sensor output to a control circuit such as an aircraft flight control separately. In a non-limiting example, there may be four independent sensors housed in and/or sensing control stick 904. In an embodiment, use of a plurality of independent sensors may result in redundant sensors. Redundant sensors, as described herein, are configured to employ more than one sensor that measures the same phenomenon, those sensors being of the same type, a combination of, or another type of sensor not disclosed above, so that in the event one sensor fails, the ability of assembly 900 to detect motion and/or position of control stick 904 and to modify control surfaces 952 of an eVTOL will not be impeded. Persons of ordinary skill in the art, upon reviewing the entirety of this disclosure, will be aware of various sensors which may be used as plurality of sensors 912 consistently with this disclosure.

With continued reference to FIG. 9, outputs from plurality of sensors 912 may be analog or digital. Processor 916 is capable of converting those output signals from plurality of sensors 912 to a usable form by controller 920. The usable form of output signals from plurality of sensors 912, through processor 916 by controller 920 may be either digital, analog, and the like, and/or any combination thereof. Processing may be configured to trim, offset, or otherwise compensate the outputs of plurality of sensors 912. Based on plurality of sensors 912 output, the processor 916 can determine the output to send to controller 920. Processor 916 can include signal amplification, operational amplifiers (OpAmp), filters, digital/analog conversion, linearization circuits, current-voltage change circuits, resistance change circuits such as Wheatstone Bridge, an error compensator circuit, or any combination thereof or otherwise undisclosed components. In an embodiment, for example and without limitation, processor 916 may use signal conditioner 944 to convert at least an electronic signal from plurality of sensors 912 to a usable form for controller 920. As a further example and without limitation, processor 916 may use digital/analog converter 948 to convert the at least an electronic signal from the plurality of sensors 912 to a usable form for controller 920. Persons or ordinary skill in the art, upon reviewing the entirety of this disclosure, will be aware of various methods of conversion which may be used by processor 916 consistently with this disclosure.

Continuing to refer to FIG. 9, the plurality of sensors 912, processor 916, and/or circuitry may be shielded from electromagnetic interference, wherein shielding may include the addition of an electromagnetic shielding material and/or positioning of components. For example and without limitation, in an embodiment, the plurality of sensors 912, processor 916, and/or circuitry are shielded by material such as mylar, aluminum, copper a combination thereof, or another suitable material. As a further non-limiting example, in an embodiment, the plurality of sensors 912, processor 916, and/or circuitry may also be shielded by location or a combination of location and material. As a non-limiting example of shielding, the signal conditioner 944 and digital/analog converter 948 are located close to the analog sensors below the seat, thereby reducing effect of electromagnetic interference.

Still referring to FIG. 9, in an embodiment, control stick 904 generates electronic signals configured to control an aircraft's motion through a fluid medium. Electronic signals generated from the control stick 904 travel through circuitry to be used by a controller 920 which is further configured to actuate control surfaces 952 of aircraft 200. In an embodiment, controller 920 may be configured to receive the at least an electronic signal from processor 916 and interpret the at least an electronic signal, wherein interpreting is configured to include actuating a control surface 952 of aircraft 200. Controller 920 may include an embedded or attached logic circuit, processor, microcontroller and/or the like. Controller 920 may include and/or communicate with any computing device, including without limitation a microcontroller, microprocessor, digital signal processor (DSP) and/or system on a chip (SoC). Controller 920 may be programmed to operate electronic aircraft 200 to perform a flight maneuver; a flight maneuver may include takeoff, landing, stability control maneuvers, emergency response maneuvers, regulation of altitude, roll, pitch, yaw, speed, acceleration, or the like during any phase of flight. A flight maneuver may include a flight plan or sequence of maneuvers to be performed during a flight plan. Controller 920 may be designed and configured to operate electronic aircraft 200 via fly-by-wire. Controller 920 is communicatively coupled to each control surface 952; as used herein, controller 920 is communicatively coupled to each control surface 952 where controller 920 is able to transmit signals to each control surface 952 and each control surface 952 is configured to modify an aspect of aircraft behavior in response to the signals. As a non-limiting example, controller 920 may transmit signals to a control surface 952 via an electrical circuit connecting controller 920 to propulsion systems 956; the circuit may include a direct conductive path from controller 920 to propulsion systems 956 or may include an isolated coupling such as an optical or inductive coupling. Propulsion systems 956 may include any propulsor as described above in further detail in reference to FIGS. 1-4. Alternatively, or additionally, controller 920 may communicate with a control surface 952 or plurality of control surfaces 952 using wireless communication, such as without limitation communication performed using electromagnetic radiation including optical and/or radio communication, or communication via magnetic or capacitive coupling. Controller 920 may be fully incorporated in an electric aircraft 200 containing control surfaces 952, and may be a remote device operating the electric aircraft remotely via wireless or radio signals, or may be a combination thereof, such as a computing device in the aircraft configured to perform some steps or actions described herein while a remote device is configured to perform other steps. Persons skilled in the art will be aware, after reviewing the entirety of this disclosure, of many different forms and protocols of communication that may be used to communicatively couple controller to control surfaces. Persons skilled in the art, upon reviewing the entirety of this disclosure, will be aware of various ways to monitor electronic signals from control stick 604 and modify aircraft control surfaces, as used and described herein.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
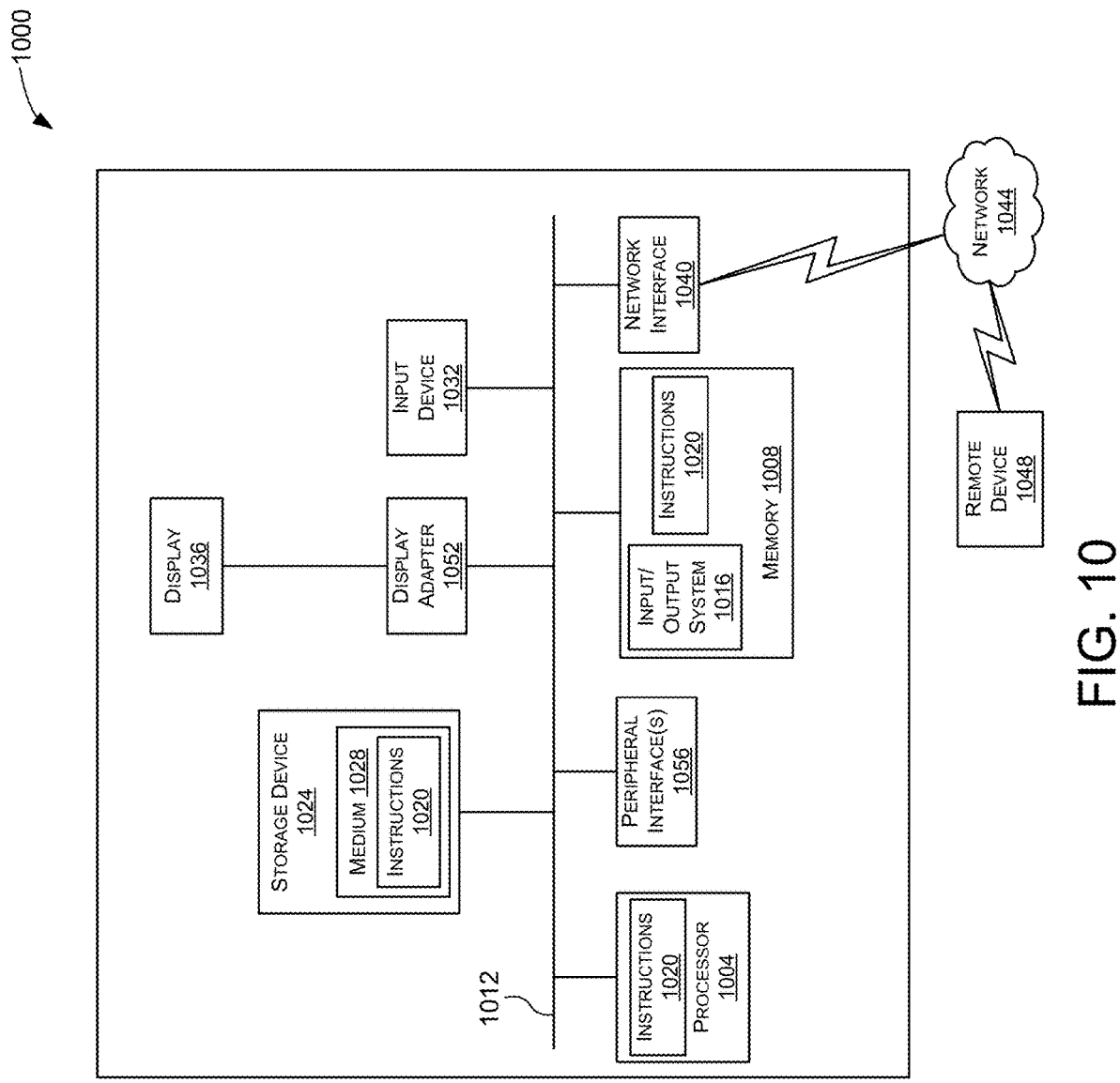
FIG. 10 is a block diagram illustrating a computing device in the example form of a computer system, according to embodiments.

FIG. 10 shows a diagrammatic representation of one embodiment of a computing device in the exemplary form of a computer system I 000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A three-dimensional control assembly for an electric aircraft, the three-dimensional control assembly comprising:
   an aircraft frame;
   a support structure coupled to the aircraft frame; and
   a control stick coupled to the support structure and having:
      a length and a radius, wherein the control stick is configured to be manipulated:
      along a first axis to control a pitch of the electric aircraft;
      along a second axis perpendicular to the first axis to control a roll of the electric aircraft; and
      rotationally about the length of the control stick to control a yaw of the electric aircraft, wherein the control stick is further configured such that rotation about the length of the control stick in a first direction changes a yaw of the electric aircraft in the first direction, and rotation about the length of the control stick in a second direction changes a yaw of the electric aircraft in the second direction; and
      a linear thrust control disposed adjacent an end of the control stick and including:
         a thumbwheel configured to control at least a forward thrust propulsor of the electric aircraft; and
         a resistance mechanism configured to change a resistance against movement of the linear thrust control based on a rotational position of the control stick.

2. The three-dimensional control assembly of claim 1, wherein the control stick is further configured such that:
   a degree of rotation of the control stick about the length of the control stick in a first direction is configured to correspond to a magnitude of change of the yaw of the electric aircraft in the first direction, and
   a degree magnitude of rotation of the control stick about the length of the control stick in a second direction is configured to correspond to a magnitude of change of the yaw of the electric aircraft in the second direction.

3. The three-dimensional control assembly of claim 2, wherein the control stick is further configured such that rotation of the control stick in the first direction corresponds to a greater magnitude of change of the yaw of the electric aircraft compared to when the control stick is rotated in the second direction by an equivalent amount.

4. The three-dimensional control assembly of claim 1 further comprising at least one vertical thrust propulsor.

5. The three-dimensional control assembly of claim 4 further comprising a throttle lever rotatably mounted to the support structure, wherein rotating the throttle lever in a first direction increases power to the at least one vertical thrust propulsor, and rotating the throttle lever in a second direction decreases power to the at least one vertical thrust propulsor.

6. The three-dimensional control assembly of claim 5 further comprising at least one forward thrust propulsor and a thrust control mounted on the throttle lever, wherein movement of the thrust control in a first direction increases forward thrust of the at least a forward thrust propulsor, and movement of the thrust control in a second direction decreases forward thrust of the at least one forward thrust propulsor.

7. The three-dimensional control assembly of claim 6, wherein the thrust control includes a neutral position wherein forward thrust generated by the at least one forward thrust propulsor is zero.

8. The three-dimensional control assembly of claim 7, wherein rotating the thrust control in a second direction relative to the neutral position causes the at least one forward thrust propulsor to generate a negative forward thrust.

9. The three-dimensional control assembly of claim 4, wherein vertical thrust generated by the at least one vertical thrust propulsor is configured to be increased and decrease in response to the manipulation of the control stick.

10. The three-dimensional control assembly of claim 9, wherein the at least one vertical thrust propulsor includes a plurality of vertical thrust propulsors, wherein pitch, roll, and yaw of the electric aircraft is configured to be controlled by a differential in thrust produced by each of the vertical thrust propulsors.

11. The three-dimensional control assembly of claim 1 further comprising at least one control surface, wherein pitch, roll, and yaw of the electric aircraft is configured to be controlled by the at least one control surface.

12. A three-dimensional control device for an electric aircraft capable of vertical and forward thrust, the three-dimensional control device comprising:
    a support structure configured to be coupled to a frame of the electric aircraft; and
    a control stick coupled to the support structure and having
       a length and a radius, wherein the control stick is configured to be manipulated:
       along a first axis to control pitch of the electric aircraft;
       along a second axis perpendicular to the first axis to control roll of the electric aircraft; and
       rotationally about the length of the control stick to control a yaw of the electric aircraft, wherein the control stick is further configured such that rotation about the length of the control stick in a first direction changes the yaw of the electric aircraft in the first direction, and rotation about the length of the control stick in a second direction changes the yaw of the electric aircraft in the second direction; and
    a linear thrust control disposed adjacent an end of the control stick and including:
       a thumbwheel configured to control at least a forward thrust propulsor of the electric aircraft; and
       a resistance mechanism configured to change a resistance against movement of the linear thrust control based on a rotational position of the control stick.

13. The three-dimensional control device of claim 12, wherein the control stick is further configured such that:
    a first degree of rotation of the control stick about the length of the control stick in a first direction is configured to correspond to a first magnitude of change of the yaw of the electric aircraft in the first direction, and
    a second degree magnitude of rotation of the control stick about the length of the control stick in a second direction is configured to correspond to a second magnitude of change of the yaw of the electric aircraft in the second direction.

14. The three-dimensional control device of claim 13, wherein the control stick is further configured such that rotation of the control stick in the first direction corresponds to a greater magnitude of change of the yaw of the electric aircraft compared to when the control stick is rotated in the second direction by an equivalent amount.

15. A three-dimensional control assembly for an electric aircraft capable of vertical and forward thrust, the three-dimensional control assembly comprising:
  an aircraft frame;
  a plurality of vertical thrust propulsors;
  a support structure coupled to the aircraft frame; and
  a control stick coupled to the support structure and including a length and a radius and is configured to be manipulated:
    along a first axis to control pitch of the electric aircraft;
    along a second axis perpendicular to the first axis to control roll of the electric aircraft; and
    rotationally about the length of the control stick to control yaw of the electric aircraft, wherein a vertical thrust generated by each vertical thrust propulsor is increased and decreased in response to the manipulation of the control stick; and
  wherein the control stick includes a linear thrust control disposed adjacent an end of the control stick and including:
    a thumbwheel configured to control at least a forward thrust propulsor of the electric aircraft; and
    a resistance mechanism configured to change a resistance against movement of the linear thrust control based on a rotational position of the control stick.

16. The three-dimensional control assembly of claim 15 wherein pitch, roll, and yaw of the electric aircraft is configured to be controlled by a differential in thrust produced by each of the vertical thrust propulsors.

17. The three-dimensional control assembly of claim 15 further comprising a throttle lever rotatably mounted to the support structure, wherein rotating the throttle lever in a first direction increases power to the plurality of vertical thrust propulsors, and rotating the throttle lever in a second direction decreases power to the plurality of vertical thrust propulsors.

18. The three-dimensional control assembly of claim 17 further comprising at least one forward thrust propulsor and a thrust control mounted on the throttle lever, wherein movement of the thrust control in a first direction increases forward thrust of the at least a forward thrust propulsor, and movement of the thrust control in a second direction decreases forward thrust of the at least one forward thrust propulsor.

19. The three-dimensional control assembly of claim 18, wherein the thrust control includes a neutral position wherein the forward thrust of the of the at least one forward thrust propulsor is zero.

20. The three-dimensional control assembly of claim 19, wherein rotating the thrust control in a second direction relative to the neutral position causes the at least one forward thrust propulsor to generate a negative forward thrust.

* * * * *